(12) United States Patent
Schleef et al.

(10) Patent No.: US 10,089,567 B2
(45) Date of Patent: Oct. 2, 2018

(54) METHOD AND APPARATUS FOR PROVIDING A COMMUNICATIONS SERVICE USING A LOW POWERED RADIO TAG

(71) Applicants: AT&T Intellectual Property I, L.P., Atlanta, GA (US); AT&T Mobility II LLC, Atlanta, GA (US)

(72) Inventors: Thomas Schleef, Richardson, TX (US); Craig Lee, Frisco, TX (US); William Francis Bradee, Plano, TX (US); Matthew J. Cook, Plano, TX (US); David Gordon Marten, Sachse, TX (US); Rick McConney, Plano, TX (US); Steve Martin, Plano, TX (US); Wesley B. Neibaur, Flower Mound, TX (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 15/380,730

(22) Filed: Dec. 15, 2016

(65) Prior Publication Data

US 2018/0174009 A1    Jun. 21, 2018

(51) Int. Cl.
*G06K 19/07* (2006.01)
*H04W 52/02* (2009.01)
*G06Q 10/08* (2012.01)

(52) U.S. Cl.
CPC ..... *G06K 19/0712* (2013.01); *G06K 19/0723* (2013.01); *G06Q 10/087* (2013.01); *H04W 52/0229* (2013.01)

(58) Field of Classification Search
CPC .................................................. G06K 19/0712
(Continued)

(56) References Cited

U.S. PATENT DOCUMENTS 5,936,527 A    8/1999 Isaacman et al.
6,593,845 B1    7/2003 Friedman et al.
(Continued)

FOREIGN PATENT DOCUMENTS

GB         2277850        9/1994
KR       101584953        1/2016
(Continued)

OTHER PUBLICATIONS

Bdiri, Sadok, and Faouzi Derbel. "An Ultra-Low Power Wake-Up Receiver for Real-time Constrained Wireless Sensor Networks." AMA Conferences Nürnberg, Germany, Proceedings SENSOR. 2015. http://www.ama-science.org/proceedings/getFile/ZwN3ZD==.
(Continued)

*Primary Examiner* — Allyson Trail

(57) ABSTRACT

A radio tag comprising a first radio and a second radio and a method for providing a communications service are disclosed. For example, the method comprises entering, by a processor of the radio tag, an active state of the radio tag and activating the second radio when a wake-up signal is received, where the second radio draws power from a power source, transmitting, by the processor of the radio tag, data to a device or receiving the data from the device when the radio tag is in the active state, and deactivating, by the processor of the radio tag, the second radio and entering an idle state when the wake-up signal is no longer being received, where only the first radio draws power from the power source for listening for the wake-up signal in the idle state.

20 Claims, 9 Drawing Sheets

(58) Field of Classification Search
USPC .................................... 235/492; 340/572.1
See application file for complete search history.

(56) References Cited

U.S. PATENT DOCUMENTS

| | | | |
|---|---|---|---|
| 7,156,312 B2 | 1/2007 | Becker et al. | |
| 7,176,784 B2 | 2/2007 | Gilbert et al. | |
| 7,215,976 B2 | 5/2007 | Brideglall | |
| 7,271,727 B2 | 9/2007 | Steeves | |
| 7,796,038 B2 | 9/2010 | Batra | |
| 7,800,503 B2 | 9/2010 | De Witte et al. | |
| 7,889,080 B2 | 2/2011 | Chan | |
| 7,912,443 B2 | 3/2011 | Rotzoll | |
| 8,026,819 B2 | 9/2011 | August et al. | |
| 8,054,160 B2 | 11/2011 | Corrado et al. | |
| 8,072,913 B2 | 12/2011 | Desai | |
| 8,339,244 B2 | 12/2012 | Peden, II et al. | |
| 8,421,601 B2 | 4/2013 | Greenlee et al. | |
| 9,041,561 B2 | 5/2015 | Wallace et al. | |
| 9,195,928 B2 | 11/2015 | Egli et al. | |
| 9,367,711 B1 | 6/2016 | Dacus et al. | |
| 9,467,118 B2 | 10/2016 | Zhou | |
| 2006/0293027 A1* | 12/2006 | Hammad | G06K 19/07309 455/410 |
| 2007/0013481 A1 | 1/2007 | Zhu et al. | |
| 2007/0205896 A1* | 9/2007 | Beber | G06K 7/0008 340/572.1 |
| 2007/0247306 A1* | 10/2007 | Case, Jr. | A43B 3/0005 340/539.11 |
| 2008/0061943 A1 | 3/2008 | Wu et al. | |
| 2008/0204138 A1* | 8/2008 | Yang | H03F 3/45183 330/258 |
| 2010/0056199 A1* | 3/2010 | Chen | H04L 1/20 455/550.1 |
| 2011/0164595 A1* | 7/2011 | So | H04W 12/06 370/338 |
| 2012/0083227 A1* | 4/2012 | Rogo | G06K 19/0715 455/90.1 |
| 2012/0313761 A1 | 12/2012 | Rolin et al. | |
| 2014/0169140 A1* | 6/2014 | Bisig | G07C 1/22 368/2 |
| 2016/0219523 A1 | 7/2016 | Twitchell, Jr. et al. | |
| 2016/0307187 A1* | 10/2016 | Guo | G06K 19/0705 |
| 2017/0295545 A1* | 10/2017 | Zacchio | H04W 88/06 |

FOREIGN PATENT DOCUMENTS

| WO | WO 2007/064747 | 6/2007 |
|---|---|---|
| WO | WO 2008/077184 | 7/2008 |

OTHER PUBLICATIONS

Che, W., et al. "Power management unit for battery assisted passive RFID tag." Electronics letters 46.8 (2010): 1. http://booksc.org/dl/43409512/10fd8d.

Swedberg, Claire. "New Axcess Chip Can Be Active or Operate as Passive Gen 2." RFID Journal, rfidjournal.com, Oct. 25, 2006. http://www.rfidjournal.com/articles/pdf?2753.

* cited by examiner

METHOD AND APPARATUS FOR PROVIDING A COMMUNICATIONS SERVICE USING A LOW POWERED RADIO TAG

The present disclosure relates to a method and apparatus for providing a communications service using a low powered radio tag via a communications network, e.g., a communications network of a network service provider, a local area network, and the like.

BACKGROUND

A business may need to track items that the business procures, produces, or distributes. For example, the item may be a product to be sent to another business or an individual. The tracking may be performed for determining current and previous locations of the item. For example, the business may wish to determine the most recent location of the item as the item traverses a path from a source location to a destination location.

SUMMARY OF THE DISCLOSURE

In one embodiment, the present disclosure discloses a radio tag, e.g., a low powered radio tag, and a method for providing a communications service. For example, a radio tag is operable to be attached to an item, the radio tag comprising a first radio comprising a first antenna, wherein the first radio is for listening for a wake-up signal in an idle state, a second radio, coupled to the first radio, the second radio comprising a second antenna, wherein the second radio is for transmitting or receiving data, wherein the radio tag operates using a carrier signal in a pre-determined frequency range for communicating with a device located within a pre-determined distance from the radio tag, a power source, a processor; and a computer-readable storage medium storing a plurality of instructions which, when executed by the processor, cause the processor to perform operations. The operations comprising entering an active state of the radio tag and activating the second radio when the wake-up signal is received, where the second radio draws power from the power source, transmitting the data to the device or receiving the data from the device when the radio tag is in the active state, and deactivating the second radio and entering the idle state when the wake-up signal is no longer being received, where only the first radio draws power from the power source.

In another example, a method for operating a radio tag having a first radio and a second radio is disclosed. For example, the method comprises entering, by a processor of the radio tag, an active state of the radio tag and activating the second radio when a wake-up signal is received, where the second radio draws power from a power source, transmitting, by the processor of the radio tag, data to a device or receiving the data from the device when the radio tag is in the active state, and deactivating, by the processor of the radio tag, the second radio and entering an idle state when the wake-up signal is no longer being received, where only the first radio draws power from the power source for listening for the wake-up signal in the idle state.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure relates to a method and apparatus for providing a communications service using a low powered radio tag via a communications network, e.g., a communications network of a network service provider.

Figure 1:
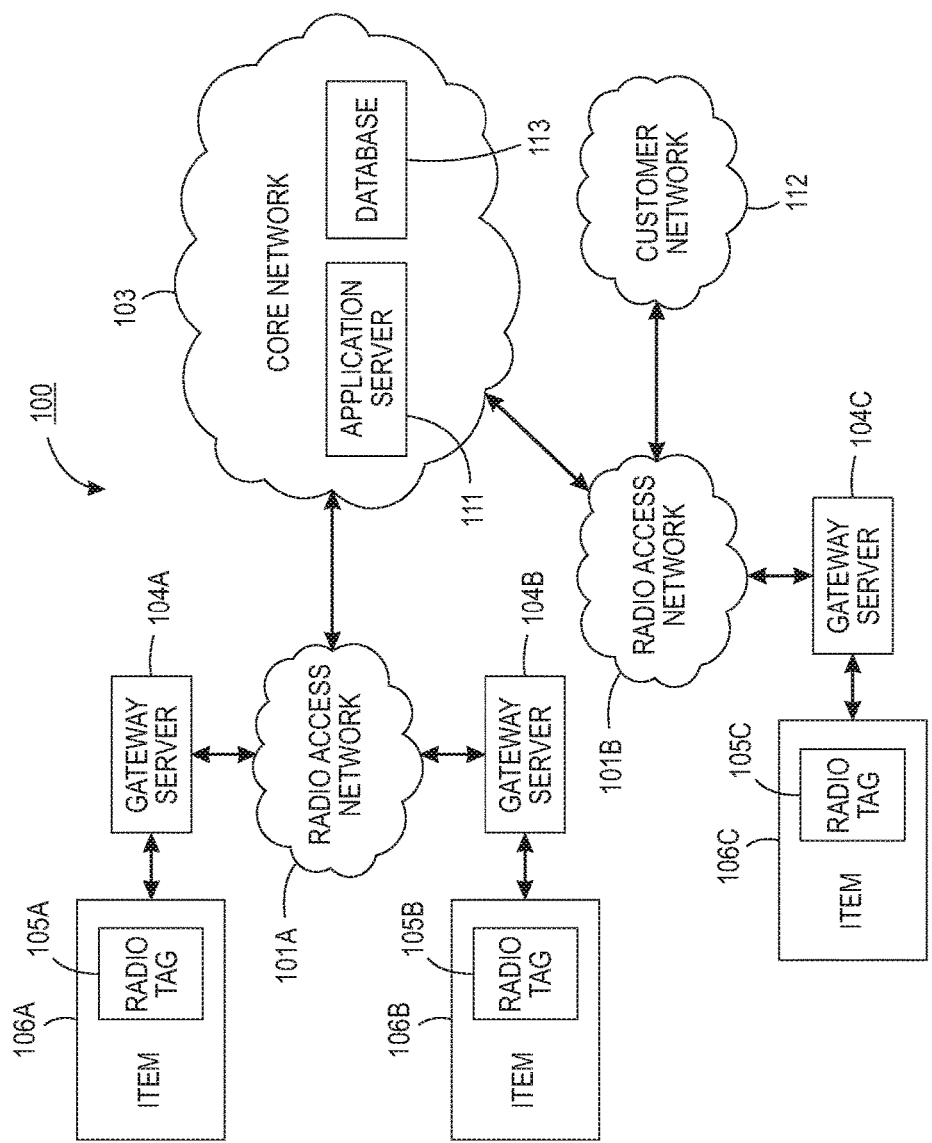
FIG. 1 illustrates an example network related to the present disclosure for providing a communications service using a low powered radio tag.

FIG. 1 illustrates an example network 100 related to the present disclosure for providing a communications service using a low powered radio tag. For clarity, the radio tag of the present disclosure may be referred to as a "low powered radio tag" or simply as a "radio tag." The characteristic of the radio tag of the present disclosure that enables the radio tag to be referred to as a "low powered radio tag" is that the radio tag of the present disclosure remains in a low power listening mode until awakened via a wake-up signal and transmits only after the radio tag is awakened. The low powered listening mode of the radio tag is a mode in which the radio tag conserves energy.

In one illustrative embodiment, the network 100 may comprise radio access networks 101a-101b, a core network 103, radio tags 105a-105c, items 106a-106c, and a customer network 112. The network 100 also comprises devices, e.g., gateway servers 104a, 104b and 104c, that are communicatively coupled to a radio access network, e.g., the radio access network 101a or 101b.

The radio access network 101a or 101b may comprise cellular or other wireless technologies, e.g., Wi-Fi networks, Long Term Evolution (LTE) networks, 3G, 4G, and 5G networks, and the like. The core network 103 may comprise any number of gateway devices, application servers, routers, switches and databases of a network service provider. For example, the core network 103 may comprise a dedicated application server 111 for providing a communications service in accordance with the present disclosure, and a database 113. The database 113 may be used for storing data, e.g., a list of radio tags, a list of gateway servers, and the like.

The customer network 112 may comprise any type of hardware systems or servers (not shown) of the customer. The customer network 112 communicates with the core network 103 via the radio access network 101b. For example, the customer network 112 may receive data from radio tags 105a-105c via a gateway server that transmitted the wake-up signal to the radio tag, a respective radio access network through which the gateway server communicates with the radio tag, and the core network.

The gateway servers 104a-104c may comprise any type of hardware systems or servers for providing a radio communication with the radio tags. A gateway server 104a, 104b or 104c communicates with a radio tag when the radio tag is located within a pre-determined distance from the gateway server, e.g., within 20 feet, 25 feet and the like. In turn, the gateway servers 104a-104b may communicate with the core network 103 via the radio access network 101a. The gateway server 104c communicates with the core network 103 via the radio access network 101b.

The radio tags 105a-105c comprise low powered radio tags of the present disclosure that will transmit information when awakened via a wake-up signal from a gateway server that is located within the pre-determined distance from the radio tag. The item 106a, 106b or 106c may be an item that is being tracked, e.g., a pallet, a box and the like. The item 106a comprises an object on which the radio tag 105a is placed, the item 106b comprises an object on which the radio tag 105b is placed, and the item 106c comprises an object on which the radio tag 105c is placed. In turn, when the item 106a, 106b or 106c is within the pre-determined distance of a gateway server 104a, 104b or 104c, the respective radio tag 105a, 105b or 105c will receive a wake-up signal from the respective gateway server located within the pre-determined distance from the item. The radio tag and the gateway server located within the pre-determined distance of each other may then establish a communication. For example, the communication may be established such that data is retrieved from the radio tag and/or provided to the radio tag. For instance, the gateway server may receive data from the radio tag attached to the item located within the pre-determined distance of the gateway server.

In one embodiment, data that is retrieved from the radio tag is forwarded to the core network 103. For example, the gateway server may forward the data to the core network 103 and the data may be stored in a database 113. In turn, the application server 111 may use the data that is stored in the database 113 to provide a communications service. For example, suppose a customer associated with the customer network 112 subscribes to a communications service for receiving data from radio tags attached to items of the customer. For instance, the radio tags of the customer may be attached to the items of the customer that are being tracked. Then, the application server 111 may provide the communications service to the customer based on the data gathered from the radio tags of the customer.

In another example, suppose the customer subscribes to a communications service that provides data to the radio tags of the customer. The application server 111 may be used for providing the communications service to the customer, such that the service is for enabling data to reach the radio tag via the gateway server. In other words, the gateway server may be used for pushing new data to the radio tag or to provide an update for data already stored in the radio tag.

Figure 2:
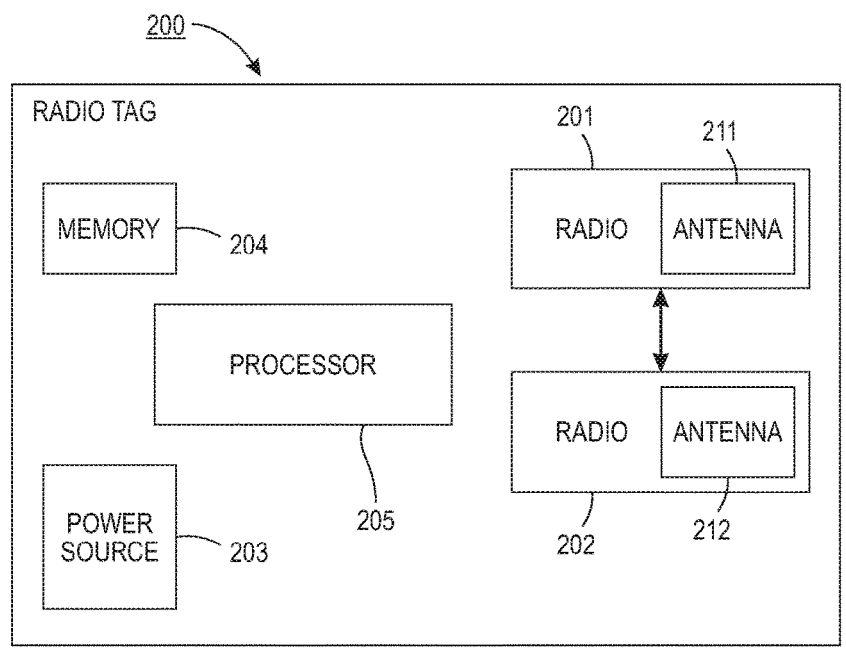
FIG. 2 illustrates an example radio tag of the present disclosure.

FIG. 2 illustrates an example radio tag 200 of the present disclosure. For example, the example radio tag may represent the radio tag 105a, 105b or 105c, as described above.

In one embodiment, the radio tag 200 comprises a first radio 201 coupled to a second radio 202, a power source 203, a memory 204, and a processor 205. The first radio 201 comprises a first antenna 211 and the second radio 202 comprises a second antenna 212. It is noted that the radio tag 200 may comprise other components. For example, the radio tag may comprise a component for enabling the radio tag to be associated with or attached to an item to be tracked. In addition, various components of the radio tag may be combined, e.g., on an integrated circuit. For example, the first radio 201, the second radio 202, the memory 204 and the processor 205 may be implemented on an integrated circuit.

In one embodiment, the processor 205 may comprise various components for generating, transmitting and/or receiving radio signals. For example, the processor 205 may include one or more of: an oscillator circuit for generating a radio frequency signal, a modulation and/or demodulation circuit, a power supply circuit, a radio frequency amplifier circuit, an antenna tuner circuit, and the like.

In one embodiment, the first radio 201 is for listening for a wake-up signal and the second radio 202 is for data traffic. For example, the first antenna 211 may be used for receiving the wake-up signal and the second antenna 212 may be used for transmitting and receiving the data traffic.

In one embodiment, the radio tag operates using a carrier signal in a pre-determined frequency range for communicating with a device, e.g., a gateway server 104a, 104b or 104c, located within a pre-determined distance from the radio tag. In one embodiment, the pre-determined distance comprises a distance for a short-range wireless communication, e.g., a pre-determined distance of about 20-30 feet. For example, the transmitter (e.g., the gateway server) and the receiver (e.g., the radio tag) may be located within 20 feet of each other.

In one embodiment, the pre-determined frequency range comprises a low frequency range. In one embodiment, the pre-determined frequency range comprises a frequency of the carrier signal being greater than or equal to seventy kilohertz and less than or equal to one hundred and fifty kilohertz. In other words, the low frequency range comprises a frequency of the carrier signal that is transmitted in a range of 70-150 kHz. The range of 70-150 kHz is only illustrative and is not a limitation of the present disclosure. For instance, a radio tag may receive a wake-up signal transmitted by a gateway server using a carrier signal within the above cited range, e.g., a wake-up signal using a carrier signal of 125 kHz.

In one example, the wake-up signal that is transmitted using a carrier signal in the low frequency range is detectable by a radio tag located within the pre-determined distance from the transmitting device (e.g., the gateway server with a transmitter), where a receiver of the radio tag is designed with sensitivity to detect the carrier signal with a peak voltage within a range of 100-130 microvolts, e.g., about 113 microvolts in one embodiment. In other words, the first radio 201 of the radio tag may detect the carrier signal with the peak voltage of about 113 microvolts. The carrier signal with a peak voltage of about 113 microvolts may be specified in terms of other equivalent units, e.g., as 80 μVrms (root-mean-square voltage in microvolts).

It should be noted that the specific values of the peak voltage being 113 microvolts and the wake-up signal using the carrier signal of 125 kHz are only examples and not intended to be limitations of the present disclosure. For example, a receiver may be designed to detect a carrier signal having a lower amplitude.

In one embodiment, the power source 203 may comprise a battery for powering the radio tag. In one embodiment, the radio tag is a device that operates with low power. For example, the radio tag may operate with a supply voltage in a range of 2.4-3.6V with a current consumption in the range of 1.5-2.0 μA. Again these ranges are only illustrative.

In one embodiment, the power source 203 may comprise an antenna for harvesting energy from an incoming carrier signal and storing the harvested energy in a battery of the radio tag, e.g., a rechargeable battery of the radio tag. For example, the power on which the radio tag operates may be harvested from a carrier signal received from a gateway server. An antenna of the radio tag, e.g., antenna 211 or 212, may be used to collect energy from the carrier signal and channel the energy towards an integrated circuit of the radio tag. The antenna 211 or 212 may have a surface area that collects enough energy from an incoming carrier signal to power the radio tag. The energy may then be used to turn the radio tag on and to transmit data to the gateway server, as needed.

The radio tag of the present disclosure has several advantages for certain deployment scenarios and implementations. For example, the frequency range of 70-150 kHz is advantageous for ensuring that the communication occurs between a transmitter and a receiver located proximate to each other in accordance with the pre-determined distance. In other words, the wake-up signal from the transmitter of the gateway server may be detectable only within the pre-determined distance that is appropriate for a short-range wireless communication (e.g., about a 20 feet radius) while being significantly attenuated beyond the pre-determined distance (e.g., beyond the 20 feet radius). Thus, a wake-up signal intended for one radio tag would not wake-up other radio tags further away from the transmitter of the wake-up signal, thereby promoting power conservation for radio tags that are outside the communication range.

In one embodiment, the radio tag of the present disclosure may be used for scenarios in which objects that interfere with high frequency signals may be present between the device transmitting the wake-up signal (e.g., the gateway server) and the radio tag receiving the wake-up signal. For example, there may be a metallic object that is proximate to the radio tag that may interfere with the radio tag's ability to communicate via a high frequency signal. In contrast, the wake-up signal of the present disclosure, which is transmitted in the low frequency range, is detectable even when the radio tag is near a metallic surface.

In one embodiment, the radio tag of the present disclosure is physically compact. For example, the radio tag may have a volume that is less than one to two cubic inches. For instance, a compact radio tag may have a length of less than three inches, a width of less than one inch and a depth of less than half an inch. The compactness of the radio tag enables placement of the radio tag in a small physical space. In one embodiment, the radio tag is embedded in another device. For example, suppose the other device is an item 106a, 106b or 106c that is being tracked. Then, the radio tag may be embedded in the item that is being tracked. In one embodiment, the radio tag is flush mounted on a surface of an item that is being tracked.

In one embodiment, the radio tag is for an application in which the radio tag operates in an "inactive," "sleep," or "hidden from view" mode until triggered by a wake-up signal. For example, the radio tag may operate only in a low power "listening" mode until the radio tag is triggered by the wake-up signal. The radio tag is said to be in the "inactive," "sleep," or "hidden from view" mode when transceivers in the vicinity of the radio tag are unable to detect any signal from the radio tag until the radio tag is triggered by the wake-up signal. When the radio tag is in the low power listening mode, the radio tag monitors for a presence of a carrier signal on an active input channel. The low power listening mode is useful for various deployment scenarios where unnecessary transmissions by the radio tag are disadvantageous. For instance, the radio tag may be located at an area where signal interference is of a concern. For example, the radio tag may be attached to an item that is being transported on an airplane. In another example, the radio tag may be located near instruments (e.g., in a hospital room). In addition to allowing the radio tag to remain hidden from view, the low power listening mode enables the radio tag to remain operational for an extended length of time without requiring a maintenance action, e.g., changing of a power source such as a battery.

In one embodiment, the second radio 202 of the radio tag comprises a radio that operates in an Industrial, Scientific and Medical (ISM) frequency band. The radio that operates in the ISM frequency band may be referred to as an ISM radio. In one embodiment, the ISM radio (i.e., the second radio of the radio tag) may comprise a Bluetooth Low Energy (BTLE) radio, an IEEE 802.15.4 standard based radio (e.g., ZigBee), and the like. The BTLE radio may also be referred to as a Bluetooth smart radio. The ISM radio may be used for communication over a short distance. For instance, the operational distance set between the gateway server and the radio tag may be intentionally limited, e.g., significantly less than 100 feet.

As described above, the radio tag of the present disclosure may be used for applications in which the radio tag may remain in the field for an extended amount of time. As such, similar to the wake-up radio, the ISM radio of the present disclosure may also operate with low power consumption. For example, the BTLE or ZigBee radio of the radio tag may be used for communicating with a gateway server while the radio tag is operating with low power consumption. Moreover, due to the attenuation of the signal between the radio tag and the gateway server, a data encryption technique may not be needed for most applications. The reduced need for data encryption and decryption further reduces power consumption by the radio tag. Consequently, the battery of the radio tag may not need to be changed for an extended length of time.

Figure 3:
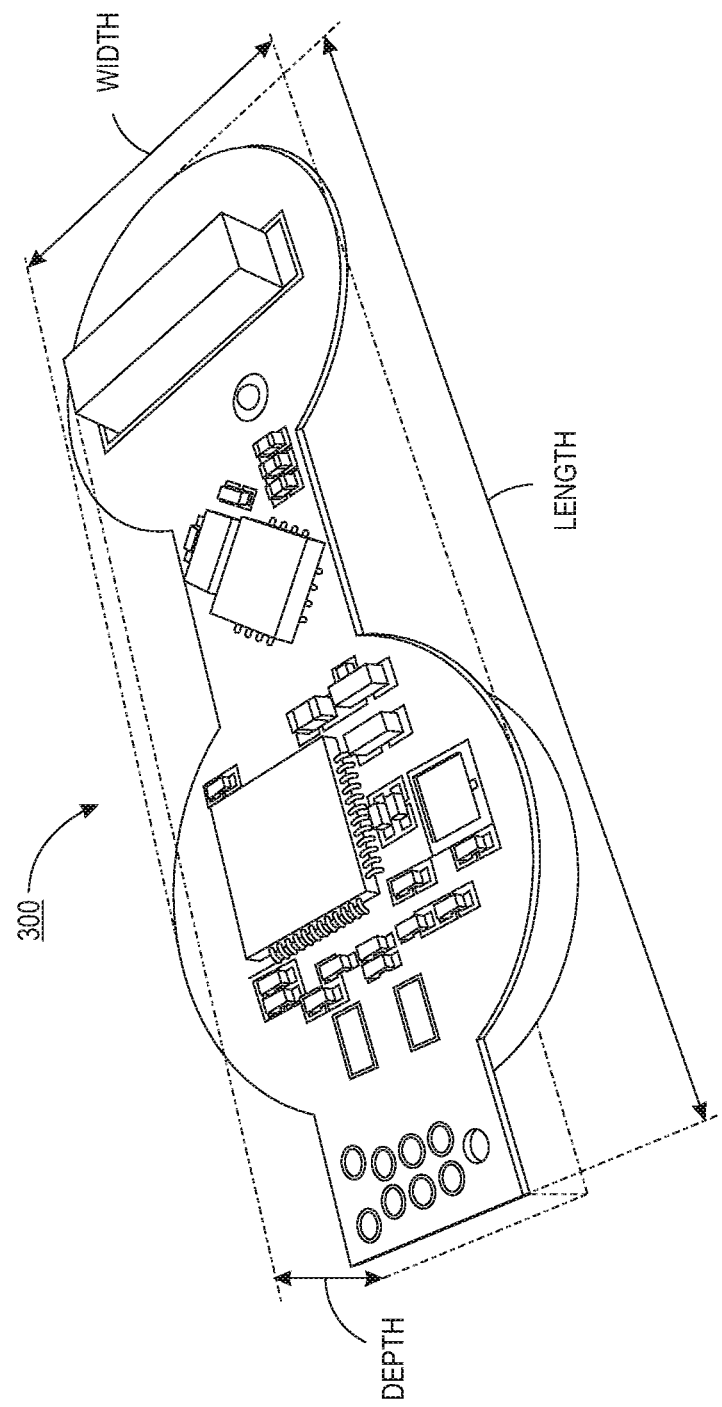
FIG. 3 illustrates an example radio tag of the present disclosure implemented on an integrated circuit.

FIG. 3 illustrates an example radio tag 300 of the present disclosure implemented on an integrated circuit. The radio tag 300 comprises a radio tag of a compact size and is designed with "shaped" edges for allowing the radio tag to be placed in an item in an interlocking manner. For example, the dimensions of the radio tag may comprise a width W of less than one inch, a length L of less than three inches and a depth D of less than 0.5 inches. Similarly, the item in which the radio tag is to be placed may have a receiving slot of similar dimensions, e.g., slightly larger dimensions, for receiving the radio tag such that the radio tag remains in the receiving slot in an interlocking manner while the item is moved from one location to another location. In one embodiment, the shaped edges of the radio tag are designed such that the radio tag fits or interlocks with the receiving slot of the item, where the radio tag and the item form an interlocking joint. When the radio tag is placed in the item, the interlocking joint permits movement of the radio tag along the depth of the item (e.g., for insertion or removal of the radio tag), but restricts movement of the radio tag along the width and the length of the item. For clarity, the depth of the item is defined as being in the same direction as the depth of the radio tag. Similarly, the width of the item is defined as being in the same direction as the width of the radio tag and the length of the item is defined as being in the same direction as the length of the radio tag.

Figure 4:
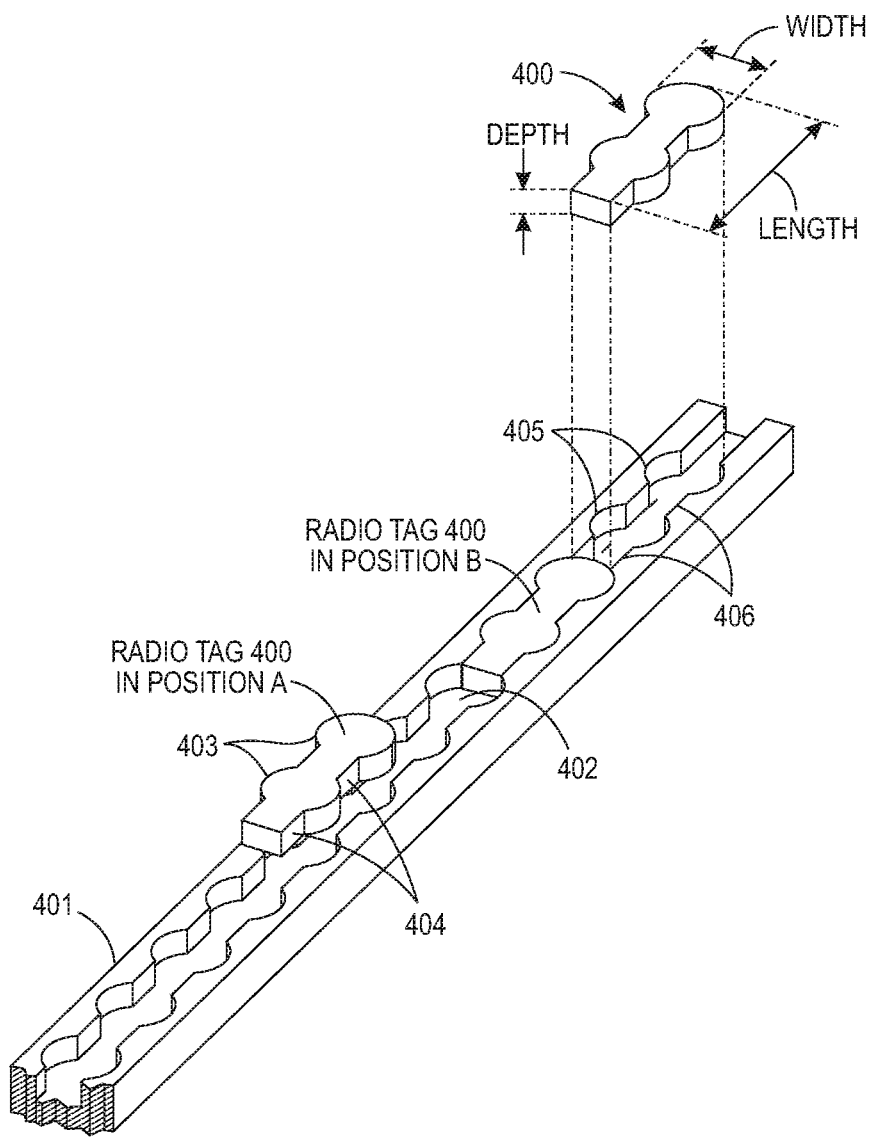
FIG. 4 illustrates an example radio tag and an item.

FIG. 4 illustrates an example radio tag 400 and an item 401. The radio tag 400 having the shaped edges (e.g., a combination of curved edges and straight edges) is operable to be attached to the item 401 for inter-engaging with the item 401. The radio tag 400 has curved edges 403 and straight edges 404 and the item 401 has curved edges 405 and straight edges 406. The curved edges 403 of the radio tag 400 are for inter-engaging with the curved edges 405 of the item 401. Similarly, the straight edges 404 of the radio tag 400 are for inter-engaging with the straight edges 406 of the item 401. It is noted that although the illustrative shape of the radio tag 400 resembles a pair of coupled turrets (e.g., alternating semi-circles and straight line portions), the shape of the radio tag 400 can be made into any other interlocking shapes.

In FIG. 4, the radio tag 400 is shown illustratively in position A and in position B. When the radio tag is in position A, the radio tag is not yet placed into the item 401. When the radio tag is in position B, the radio tag is placed into a receiving slot 402 of the item 401. Inter-engaging edges of the radio tag 400 and the inter-engaging edges of the item 401 form an interlocking joint that only permits movement (e.g., insertion or removal) of the radio tag along the depth of the item 401 while restricting movement of the radio tag along the width and the length of the item 401. For example, when the radio tag 400 is in receiving slot 402 (e.g., as shown in position B), the radio tag may be removed from the receiving slot by moving the radio tag along the depth. However, the radio tag 400 cannot slide along the length or the width of the item 401. Once inserted into the receiving slot 402, the top surface of the radio tag 400 is flushed with a top surface of the item 401.

Figure 5:
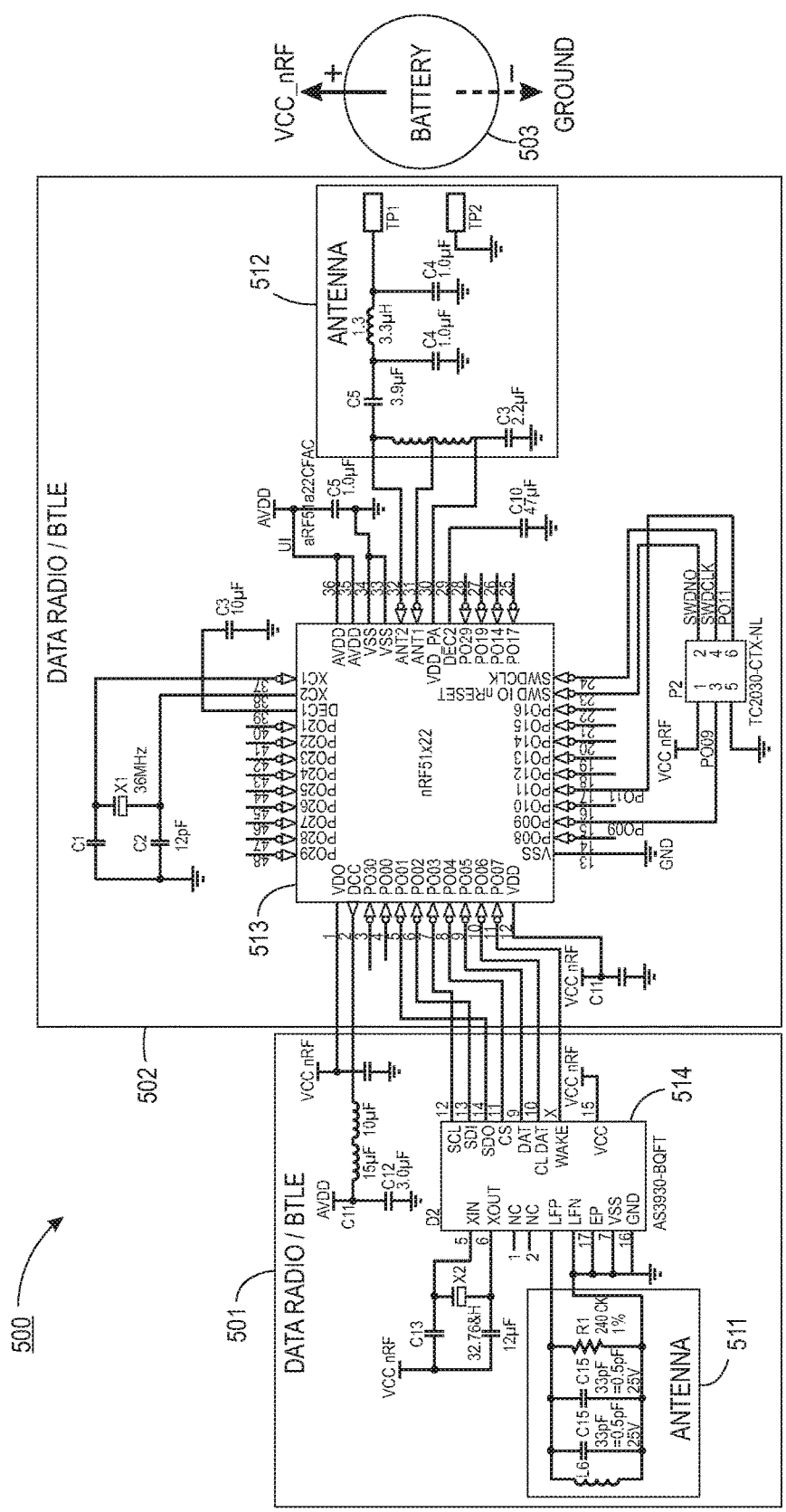
FIG. 5 illustrates an example schematic diagram of a radio tag of the present disclosure.

FIG. 5 illustrates an example schematic diagram of a radio tag 500 of the present disclosure. For example, the schematic diagram may be for the radio tag 300 as shown in FIG. 3. The radio tag comprises a first radio 501 coupled to a second radio 502, and a power source 503. The first radio 501 may comprise at least a first antenna 511 and a single channel low frequency wake-up signal receiver 514, e.g., AS3933 of ams AG of Austria. The second radio 502 may comprise at least a second antenna 512 and a Bluetooth transceiver 513, e.g., nRF51×22 of Nordic Semiconductor of Norway. It should be noted that the radio tag 500 as shown in FIG. 5 is only illustrative as to one example as to how radio tag 500 can be implemented, but the specific structure and layout as shown in FIG. 5 should not be deemed as a limitation of the present disclosure.

Figure 6:
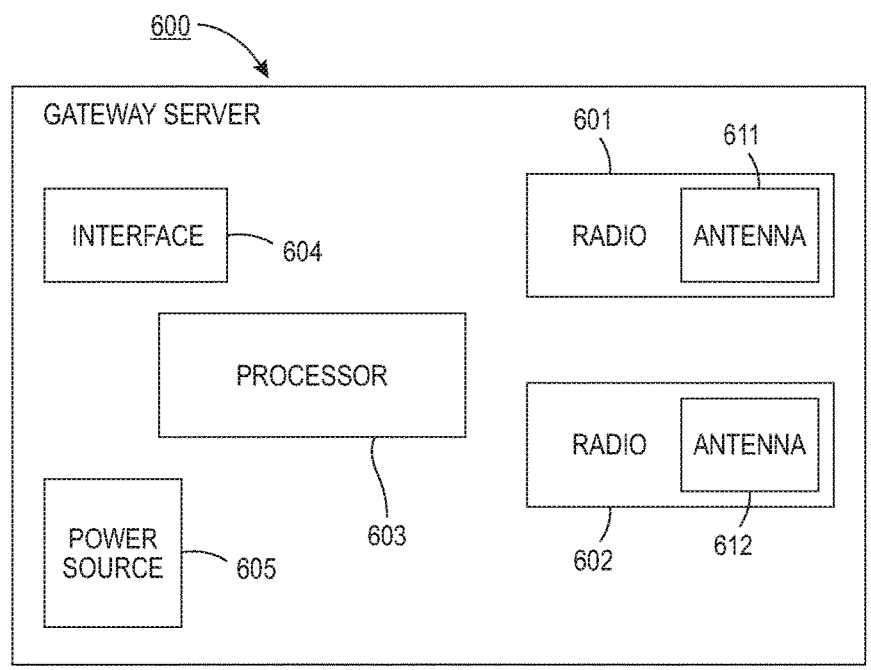
FIG. 6 illustrates an example gateway server of the present disclosure.

FIG. 6 illustrates an example gateway server 600 related to the present disclosure. For example, the example gateway server may represent the gateway server 104*a*, 104*b* or 104*c*, as described above.

In one illustrative embodiment, the gateway server 600 comprises a first radio 601, a second radio 602, a processor 603, an interface 604 for interacting with a network, and a power source 605. The first radio 601, the second radio 602 and the interface 604 are coupled to the processor 603. The power source 605 provides power to any number of components of the gateway server. For example, the power source may provide power to the first radio 601, the second radio 602, the processor 603, and/or the interface 604. It is noted that any number of power sources may be used to provide power to various components of the gateway server.

In one embodiment, the first radio 601 comprises a first antenna 611 and the second radio 602 comprises a second antenna 612, where the first radio 601 is used for transmitting a wake-up signal to one or more radio tags. In one embodiment, the second radio 602 is used for data traffic. For example, the second radio 602 may be a two-way radio for transmitting data traffic to the radio tags and/or for receiving data traffic from the radio tags.

In one embodiment, the processor or processing unit 603 may comprise various components for generating and transmitting and/or receiving radio signals. For example, the processor or processing unit 603 may include one or more of: an oscillator circuit for generating the radio frequency signal, a modulation and/or demodulation circuit for modulating and/or demodulating the data traffic onto or from the carrier signal, a power supply circuit for transforming the modulated signal to a signal of appropriate voltage level for transmission, a power supply circuit for transforming a received signal to a signal of appropriate voltage level for processing (e.g., for demodulation and decoding), a radio frequency amplifier circuit for amplifying the radio signal such that the radio signal is able to reach receivers, an antenna tuner circuit for transferring power to an antenna without generating a standing wave, and the like.

In one embodiment, the interface 604 for interacting with a network may comprise: an interface for communicating with a network of a communications service provider, an interface for communicating with a private network (e.g., an enterprise local area network), a modem for providing a backhauling function to a location of a switch or a router of a network service provider, an interface to an access network (e.g., a radio access network), and so on. For example, the interface 604 may be used for effecting communications between the gateway server 600 and a server in the core network 103, illustrated in FIG. 1. For instance, the interface 604 may be an interface of the gateway server 104*a*, 104*b* or 104*c*.

Returning to the radio tag, the radio tag of the present disclosure operates in at least two states: an idle state and an active state. When the radio tag is in the idle state, the first radio of the radio tag is turned on and set to a low power listening mode and the second radio of the radio tag is turned off. When the radio tag is in the idle state, there is no transmission of data traffic from the radio tag. The radio tag may remain in the idle state for an extended length of time until the radio tag is placed near a device that transmits a wake-up signal. For example, the radio tag may reach a location that is proximate to a gateway server. When the wake-up signal from the gateway server is detected, the radio tag enters the active state. When the radio tag is in the active state, the second radio of the radio tag is also turned on.

For an illustrative example, assume that the radio tag is attached to an item, e.g., a pallet or a box, that is being moved from location A to location B. Suppose there are several gateway servers that transmit wake-up signals to radio tags along the path traversed by the item between locations A and B. When the radio tag is located far from all of the gateway servers and the radio tag is unable to receive a wake-up signal from any of the gateway servers, the radio tag remains in the idle state. As the radio tag reaches an area at which the radio tag is able to receive a wake-up signal (e.g., while the first radio is in the low power listening mode), the radio tag detects the wake-up signal via the first radio. The wake-up signal may be from any one of the several gateway servers. Once the wake-up signal is detected, the second radio is then also enabled. For example, the processor of the radio tag enables the second radio and enters into the active state. A radio tag in the active state may communicate with the gateway server to transmit and/or receive data traffic. For example, the radio tag may communicate with the gateway server from which the wake-up signal is received. Suppose the radio tag exits the area in which the radio tag is able to detect the wake-up signal. Then, the second radio is turned off and the radio tag returns to the idle state. For example, when the radio tag is relocated to an area in which it is no longer able to detect the wake-up signal, the radio tag exits the active state, returns to the idle state, and remains in the low power listening mode until another wake-up signal is again detected.

Figure 7:
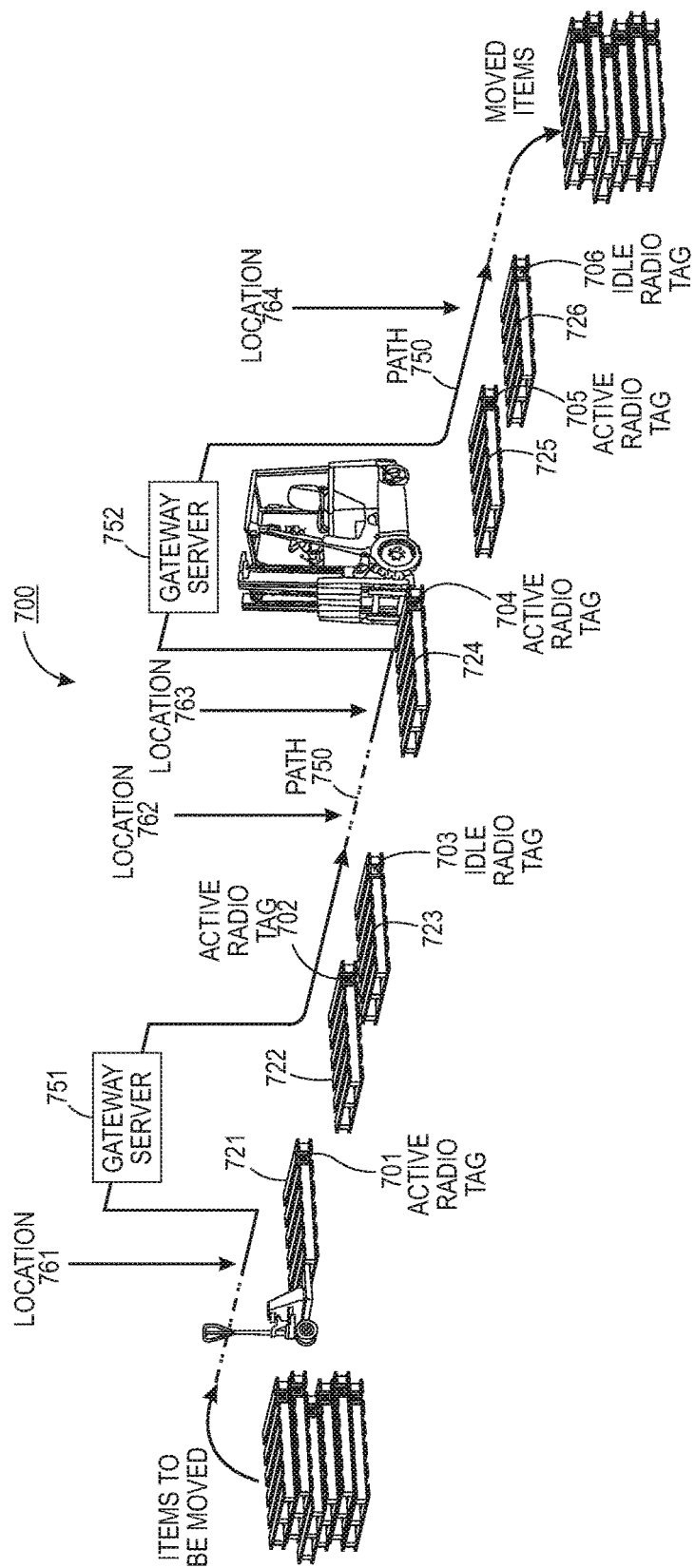
FIG. 7 illustrates an example of radio tags and gateway servers interacting in accordance with the present disclosure.

FIG. 7 illustrates an example 700 of radio tags and gateway servers interacting with each other in accordance with the present disclosure. Radio tags 701-706 are affixed onto items 721-726, respectively, which are illustrated as a plurality of pallets. In this illustrative example, the pallets 721-726 are moved along a path 750. When item 721 reaches a location 761, the radio tag 701 receives a wake-up signal from a gateway server 751. In turn, the radio tag 701 enters the active state and transmits data to the gateway server 751. The transmitted data can be any type of data including but not limited to: the origination location of the pallet, the destination location of the pallet, the type of goods stored on the pallet, the weight of the goods stored on the pallet, the date in which the pallet left the origination location, the date in which the pallet is to arrive at the destination location, the identity of the owner or sender of the goods stored on the pallet, the identity of the recipient of the goods stored on the pallet, the dollar value of the goods stored on the pallet, an expiration date of the goods stored on the pallet, toxicity information associated with the goods stored on the pallet, transportation information (e.g., rail transportation information, trucking information) associated with the goods stored on the pallet (e.g., companies that were used in transporting the goods), insurance information associated with the goods stored on the pallet, recycling information associated with the goods stored on the pallet, and so on. It should be noted that the above list of different types of transmitted data is only illustrative and is not a limitation of the present disclosure.

Returning to FIG. 7, as the pallet 721 continues moving along the path 750, radio tag 701 returns to the idle state. For example, when the pallet 721 reaches location 762, the radio tag 701 returns to the idle state. Then, when the pallet 721 reaches location 763, the radio tag 701 is able to receive another wake-up signal from gateway server 752. The radio tag 701 again enters into the active state and transmits data to the gateway server 752. When the pallet 721 reaches location 764, the radio tag 701 is now out of the communication range with gateway server 752 and will be unable to receive the wake-up signal. Then, the radio tag 701 will again return to the idle state. It is noted that any number of the radio tags 701-706 affixed onto the pallets 721-726 may use the same path 750 and receive a plurality of wake-up signals from the gateway server 751 and/or 752. As each pallet is moved from location 761 to location 764, the radio tag attached to the respective pallet enters into the active state when it receives the wake-up signal and returns to the idle state when it reaches a location at which the radio tag is unable to receive a wake-up signal. In FIG. 7, the radio tags 701-702 and 704-705 are shown as radio tags in the active state because at the locations at which the radio tags 701-702 and 704-705 are shown in FIG. 7, the radio tags 701-702 and 704-705 are able to receive a wake-up signal either from the gateway server 751 or the gateway server 752. Similarly, the radio tags 703 and 706 are shown as being in the idle state because the radio tags 703 and 706 are at locations at which they are unable to receive a wake-up signal. It is also noted that other gateway servers may be provided at various other locations, e.g., at the source and destination locations of the pallets and the like.

Returning to FIG. 1, it should be noted that the network 100 may include additional networks and/or elements that are not shown to simplify FIG. 1. For example, the radio access network and the core network of FIG. 1 may include additional network elements (not shown), such as for example, base stations, border elements, gateways, firewalls, routers, switches, call control elements, various application servers, and the like. In addition, various types of data may be stored in any number of databases. For instance, various databases, e.g., a database for a list of radio tags that are being monitored or tracked, a database for data gathered from radio tags and/or to be provided to radio tags that are being monitored and/or tracked, a database for a list of gateway servers through which a radio tag of the present disclosure, a database for a list of customers, a database for a list of network devices in a customer network to which data received from a radio tag is to be forwarded, may be provided. In addition, the various types of data may also be stored in a cloud storage. In other words, the network service provider may implement the service for providing a communications service using low powered radio tags of the present disclosure by storing the data gathered from the low powered radio tags in a cloud storage and/or a centralized server.

In one embodiment, the radio tag, e.g., radio tag 105a, 105b or 105c, is used for transmitting data, e.g., monitoring and/or tracking data, to a network via a gateway server. The tracking data refers to data related to a physical location, e.g., an address or Global Positioning System (GPS) coordinates. The monitoring data may refer to data related to the location but may also be for various data related to the configuration, manufacturer, model, serial number, security protocol, etc., of the radio tag. In other words, the monitoring and/or tracking data may include any type of data stored in the radio tag for transmission to a network via a gateway server as discussed above. In one example, since the network is aware of the physical location of the gateway server, the tracking may be for determining a location, e.g., a geographical location, of the radio tag by using the location of the gateway server. For example, the radio tag communicating with a particular gateway server will imply that the radio tag is proximate to the location of that particular gateway server. A time stamp recorded when the radio tag is communicating with each gateway server along the path 750 will allow the network to track the progress of a pallet traversing along the path. The path can be a transportation route such as a railroad track, a road, or a waterway. Similarly, the path could be within an enclosed facility such as a large warehouse and the like.

In one embodiment, the AS 111 is used for providing a communications service to a customer. The customer may be a subscriber to a communications service for tracking and/or monitoring radio tags associated with the customer. For example, a customer Y may attach radio tags to items of the customer Y that are to be monitored or tracked. The network service provider may gather data from the radio tags attached to the items of customer Y. The network service provider may then forward the data that is gathered to the customer. In one embodiment, the data that is gathered from the radio tags may be forwarded to the customer, e.g., customer Y, in a pre-determined schedule. In one embodiment, the data that is gathered from the radio tags may be forwarded to the customer upon receiving a query. For instance, the AS 111 may receive a query from the customer network 112. In turn, AS 111 may provide the requested data to the customer network 112. For example, data stored in the database 113 that was previously obtained from a radio tag of the customer may be forwarded to the customer network 112.

Figure 8:
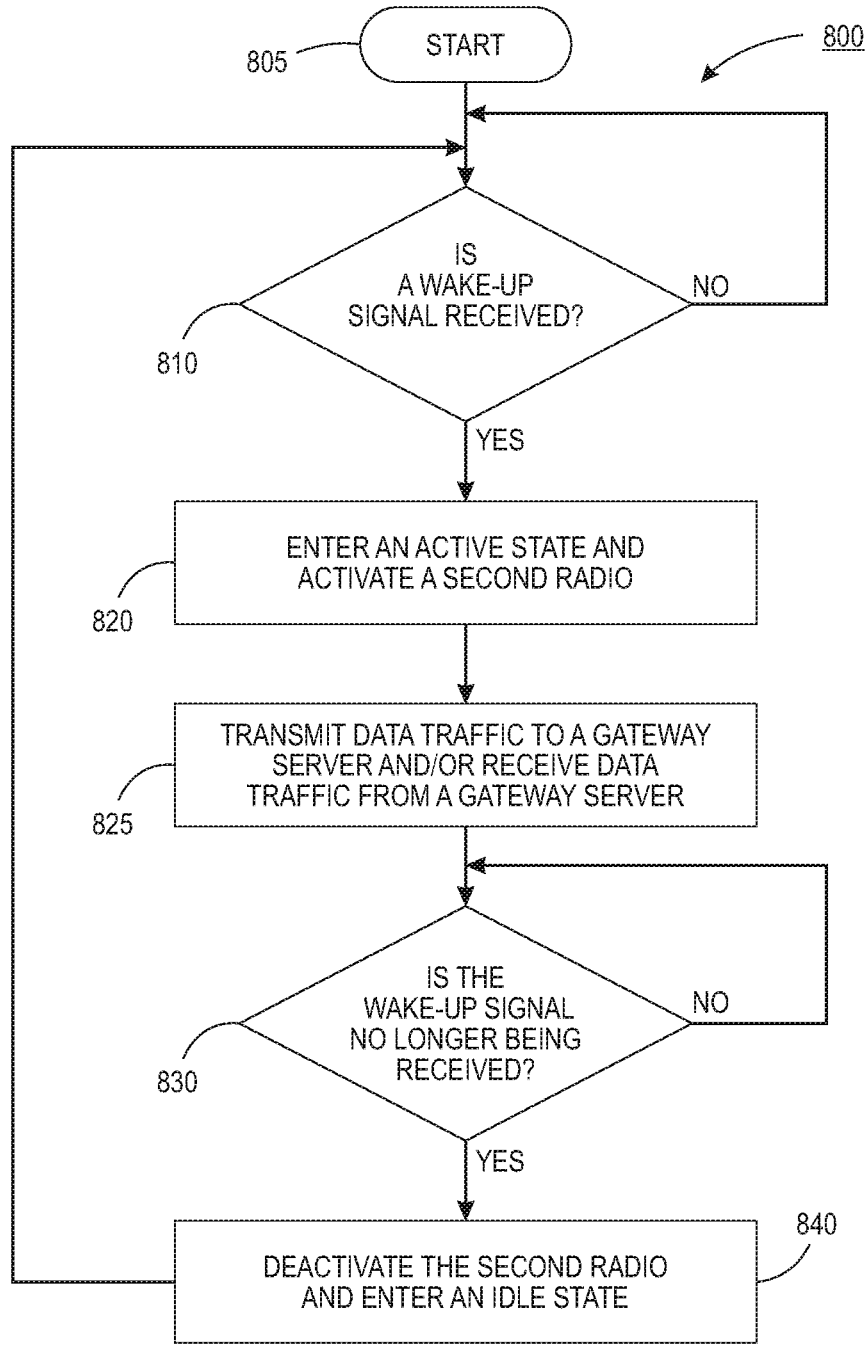
FIG. 8 illustrates a flowchart of an example method for providing a communications service for a radio tag via a communications network.

FIG. 8 illustrates a flowchart of an example method 800 for providing a communications service for a radio tag via a communications network in accordance with the present disclosure. In one embodiment, the method 800 may be implemented in a radio tag, e.g., radio tag 105a, 105b or 105c of FIG. 1, or the processor 902 as described in FIG. 9.

The method 800 may be implemented on any number of radio tags. For clarity, the flowchart of the example method 800 is described herein for one radio tag. The method 800 starts in step 805 and proceeds to step 810.

In step 810, the processor of a radio tag determines whether a wake-up signal is received. The determination as to whether the wake-up signal is received is made by listening for a wake-up signal via a first radio of the radio tag that comprises a first antenna. The radio tag may determine whether the wake-up signal is received while the first radio of the radio tag is in a low power listening mode. For example, the radio tag remains in an idle state until the wake-up signal is received. When the wake-up signal is received, the processor proceeds to step 820. For instance, suppose the first radio of the radio tag is able to detect a wake-up signal from a gateway server located within 20 feet of the radio tag, and the radio tag is 10 feet away from the device, e.g., the gateway server. Then, the wake-up signal is detected and the processor proceeds to step 820. Otherwise, the processor remains in step 810 and the first radio of the radio tag continues to listen for the wake-up signal.

In step 820, the processor enters an active state of the radio tag and activates a second radio that comprises a second antenna of the radio tag. For example, the processor may exit the idle state of the radio tag, power up the second radio, and activate the second antenna which is to be used for transmitting and/or receiving data.

In step 825, the processor transmits data traffic to the gateway server and/or receives data traffic from the gateway server. For example, suppose there is data stored in the radio tag that is to be transmitted to the gateway server. Then, the second radio of the radio tag is used to transmit the data to the gateway server. In another example, suppose there is data to be provided to the radio tag by the network service provider via the gateway server. Then, the network service provider may push the data to the radio tag via the gateway server. In one embodiment, the second radio of the radio tag comprises a two-way radio for sending and receiving data traffic.

In step 830, the processor determines whether the wake-up signal is no longer being received. For example, the radio tag may remain in the vicinity of the gateway server such that the first radio of the radio tag continues to detect the wake-up signal while the radio tag is in the active state. When the wake-up signal is no longer being received (e.g., the gateway server is out of communication range), the processor proceeds to step 840. Otherwise, the processor remains in step 830. Thus, as long as the radio tag remains at a location at which the wake-up signal continues to be received, data traffic may continue being transmitted/received between the gateway server and the radio tag. For example, the radio tag remains in the active state, transmits and/or receives data using the second radio, and continues listening for the wake-up signal using the first radio to determine whether the wake-up signal is still being received.

In step 840, the processor deactivates the second radio and enters the idle state. For example, the second radio may be turned off to conserve energy. The processor then returns to step 810.

In addition, although not specifically specified, one or more steps, functions or operations of method 800 may include a storing, displaying and/or outputting step as required for a particular application. In other words, any data, records, fields, and/or intermediate results discussed in the method can be stored, displayed and/or outputted either on the device executing the method or to another device, as required for a particular application.

Furthermore, steps, blocks, functions or operations in FIG. 8 that recite a determining operation or involve a decision do not necessarily require that both branches of the determining operation be practiced. In other words, one of the branches of the determining operation can be deemed as an optional step. Moreover, steps, blocks, functions or operations of the above described method 800 can be combined, separated, and/or performed in a different order from that described above, without departing from the example embodiments of the present disclosure.

As such, the present disclosure provides at least one advancement in the technical field of communication using a low powered radio tag. For instance, in one example, a radio tag of the present disclosure determines whether a wake-up signal is received by listening for a wake-up signal via a first radio that comprises a first antenna of the radio tag while the radio tag is in a low power listening mode, the radio tag enters an active state and activates a second radio that comprises a second antenna of the radio tag when the wake-up signal is received, the radio tag transmits data traffic to a gateway server and/or receives data traffic from the gateway server, and the radio tag deactivates the second radio and enters the idle state when the radio tag determines that the wake-up signal is no longer being received. The listening for the wake-up signal in accordance with the present disclosure is performed for detecting a low frequency signal, e.g., a signal in the range of 70-150 kHz. In addition, the radio tag of the present disclosure operates with low power and deactivates the antenna used for data traffic while the radio tag is in the low power listening mode.

In addition, the present disclosure provides at least one advancement in tracking and/or monitoring of radio tags. A network service provider may provide a service to a subscriber for monitoring and/or tracking of the radio tags. For instance, the network service provider may gather data from a radio tag via a gateway server that transmits a wake-up signal to the radio tag. As described above, the radio tag listens for the wake-up signal and provides data to the gateway server. The gateway server may provide the data gathered from the radio tag to the network service provider. The subscriber may then receive the data from the network service provider. This allows the subscriber to leverage the reliable network infrastructure of the network service provider without having to build its own network of gateway servers. For example, the network service provider may install a distributed network of gateway servers that may be used to transmit wake-up signals to such radio tags, gather data from the radio tags, and store the data that is gathered in a database. The data that is gathered from radio tags associated with a subscriber may then be provided to the subscriber. In one embodiment, the data may be provided to the subscriber in accordance with a pre-determined schedule. In another embodiment, the data may be provided to the subscriber when the network service provider receives a query from the subscriber.

Figure 9:
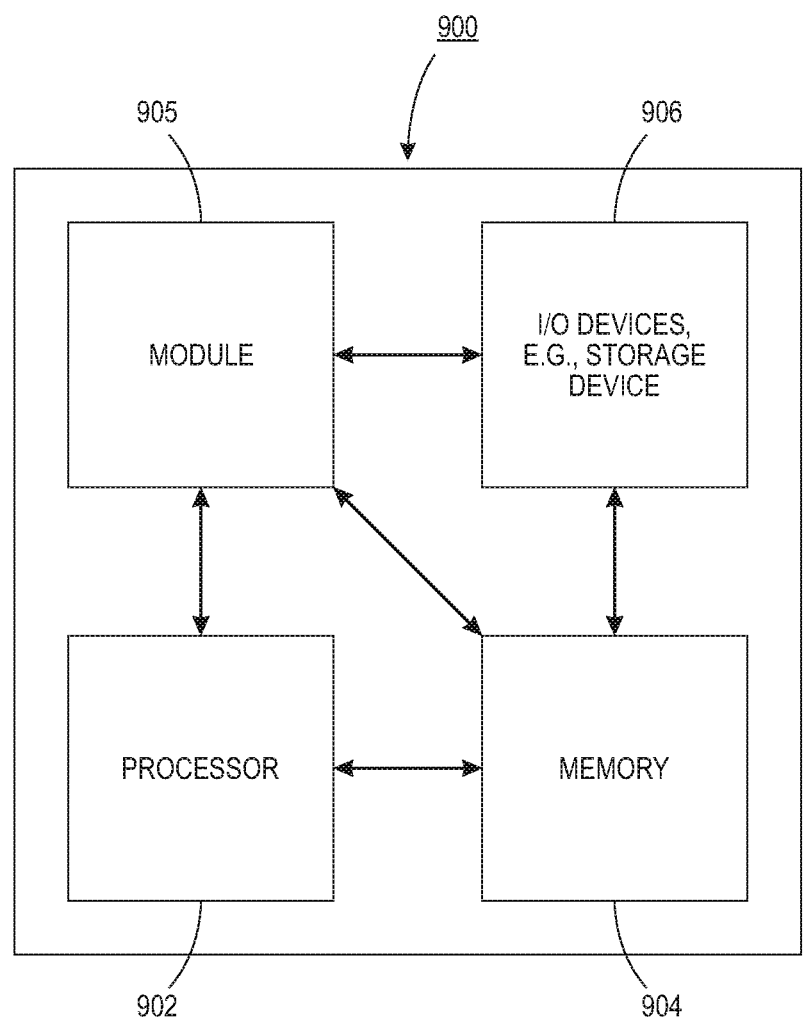
FIG. 9 depicts a high-level block diagram of a computer suitable for use in performing the functions described herein.

FIG. 9 depicts a high-level block diagram of a computer suitable for use in performing the functions described herein. As depicted in FIG. 9, the system 900 comprises one or more hardware processor elements 902 (e.g., a central processing unit (CPU), a microprocessor, or a multi-core processor), a memory 904, e.g., random access memory (RAM) and/or read only memory (ROM), a module 905 for providing a communications service using a low powered radio tag, and various input/output devices 906 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements. Furthermore, although only one computer is shown in the figure, if the method 800 as discussed above is implemented in a distributed or parallel manner for a particular illustrative example, i.e., the steps of the above method 800 or the entire method 800 is implemented across multiple or parallel computers, then the computer of this figure is intended to represent each of those multiple computers.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computer or any other hardware equivalents, e.g., computer readable instructions pertaining to the method(s) discussed above can be used to configure a hardware processor to perform the steps, functions and/or operations of the above disclosed method.

In one embodiment, instructions and data for the present module or process 905 for providing a communications service using a low powered radio tag (e.g., a software program comprising computer-executable instructions) can be loaded into memory 904 and executed by hardware processor element 902 to implement the steps, functions or operations as discussed above in connection with the illustrative method 800. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 905 for providing a communications service using a low powered radio tag (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. A radio tag operable to be attached to an item, the radio tag comprising:
a first radio comprising a first antenna, wherein the first radio is for listening for a wake-up signal in an idle state of the radio tag;
a second radio, coupled to the first radio, the second radio comprising a second antenna, wherein the second radio is for transmitting or receiving data, wherein the radio tag operates using a carrier signal in a pre-determined frequency range for communicating with a device located within a pre-determined distance from the radio tag, wherein the second radio does not draw power in the idle state of the radio tag;
a power source;
a processor; and
a computer-readable storage medium storing a plurality of instructions which, when executed by the processor, cause the processor to perform operations, the operations comprising:
entering an active state of the radio tag and activating the second radio when the wake-up signal is received, wherein the second radio draws power from the power source in the active state of the radio tag;
transmitting the data to the device or receiving the data from the device via the second radio when the radio tag is in the active state; and
deactivating the second radio and entering the idle state of the radio tag when the wake-up signal is no longer being received, wherein the first radio draws power from the power source in the idle state of the radio tag.

2. The radio tag of claim 1, wherein the radio tag is attached to the item to form an interlocking joint, wherein the interlocking joint permits a movement of the radio tag along a depth of the item and restricts the movement of the radio tag along a width and a length of the item.

3. The radio tag of claim 1, wherein the first radio of the radio tag is in a low power listening mode when the radio tag is in the idle state of the radio tag.

4. The radio tag of claim 1, wherein the second radio of the radio tag is completely turned off when the second radio is deactivated.

5. The radio tag of claim 1, wherein the first radio and the second radio are both turned on when the radio tag is in the active state of the radio tag.

6. The radio tag of claim 1, wherein the second radio of the radio tag comprises a radio that operates in an industrial, scientific and medical frequency band.

7. The radio tag of claim 1, wherein the pre-determined frequency range comprises a frequency of the carrier signal within a range of 70-150 kilohertz.

8. The radio tag of claim 1, wherein the device comprises a gateway server.

9. The radio tag of claim 1, wherein the carrier signal is detectable by the radio tag only when the radio tag is located within the pre-determined distance from the device.

10. The radio tag of claim 1, wherein the pre-determined distance comprises a distance within a range of 20-30 feet.

11. The radio tag of claim 1, wherein the first radio comprises a receiver with a sensitivity for detecting the carrier signal with a peak voltage within a range of 100-130 microvolts.

12. The radio tag of claim 1, wherein the device provides the data received from the radio tag to a network service provider.

13. The radio tag of claim 12, wherein the data is provided to the network service provider in a pre-determined schedule.

14. The radio tag of claim 12, wherein the data is provided to the network service provider upon the device receiving a query from the network service provider.

15. The radio tag of claim 1, wherein the power source comprise a battery.

16. The radio tag of claim 1, wherein the item comprises a pallet.

17. The radio tag of claim 1, wherein the item comprises a box.

18. The radio tag of claim 1, wherein the radio tag has a physical dimension that is less than two cubic inches.

19. A non-transitory computer-readable storage device storing a plurality of instructions which, when executed by a processor of a radio tag having a first radio and a second radio, cause the processor to perform operations, the operations comprising:

entering an active state of the radio tag and activating the second radio when a wake-up signal is received by the first radio, wherein the second radio draws power from a power source in the active state of the radio tag and does not draw power from the power source in an idle state of the radio tag;

transmitting data to a device or receiving the data from the device via the second radio when the radio tag is in the active state; and deactivating the second radio and entering an idle state of the radio tag when the wake-up signal is no longer being received, wherein the first radio draws power from the power source for listening for the wake-up signal in the idle state of the radio tag.

20. A method for operating a radio tag having a first radio and a second radio, the method comprising:

entering, by a processor of the radio tag, an active state of the radio tag and activating the second radio when a wake-up signal is received by the first radio, wherein the second radio draws power from a power source in the active state of the radio tag and does not draw power from the power source in an idle state of the radio tag;

transmitting, by the processor of the radio tag, data to a device or receiving the data from the device via the second radio when the radio tag is in the active state; and deactivating, by the processor of the radio tag, the second radio and entering the idle state of the radio tag when the wake-up signal is no longer being received, wherein the first radio draws power from the power source for listening for the wake-up signal in the idle state of the radio tag.

* * * * *